Figure 2:
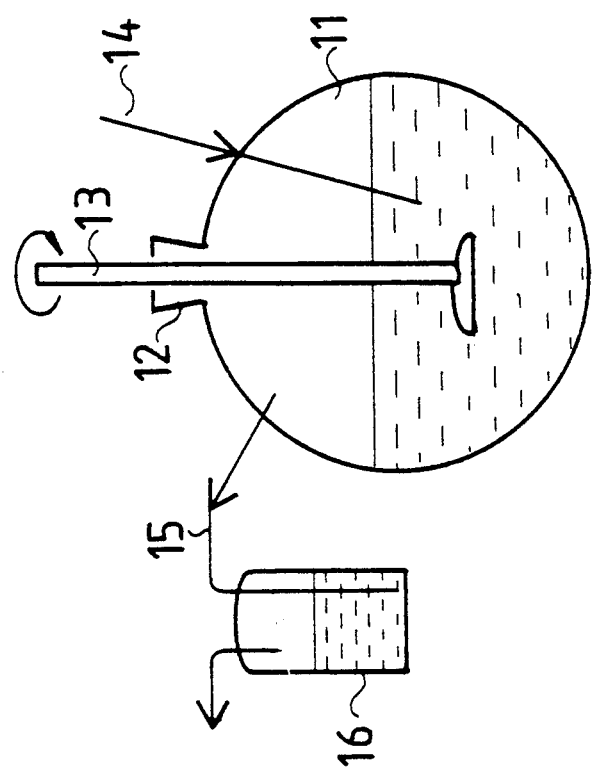

United States Patent [19]
Staffel et al.

[11] Patent Number: 5,180,566
[45] Date of Patent: Jan. 19, 1993

[54] PROCESS FOR THE REMOVAL OF AMMONIA FROM GASES

[75] Inventors: Thomas Staffel; Renate Adrian, both of Hürth, Fed. Rep. of Germany

[73] Assignee: Hoechst Aktiengesellschaft, Frankfurt am Main, Fed. Rep. of Germany

[21] Appl. No.: 731,540

[22] Filed: Jul. 17, 1991

[30] Foreign Application Priority Data

Jul. 31, 1990 [DE] Fed. Rep. of Germany ....... 4024241

[51] Int. Cl.⁵ .................. C01C 3/00; C01B 15/16; C01B 25/26
[52] U.S. Cl. .................................... 423/238; 423/315
[58] Field of Search ........................... 423/238, 315

[56] References Cited

U.S. PATENT DOCUMENTS

| | | | |
|---|---|---|---|
| 3,687,618 | 8/1972 | Clausen | 423/315 |
| 3,978,195 | 8/1976 | Schrödter et al. | |
| 4,271,134 | 6/1981 | Teller | 423/238 |

FOREIGN PATENT DOCUMENTS 0016591 7/1980 European Pat. Off. .
0377476 11/1990 European Pat. Off. .

OTHER PUBLICATIONS

World Patents Index/Derwent, AN 78-13477A.

Primary Examiner—Gregory A. Heller
Attorney, Agent, or Firm—Connolly & Hutz

[57] ABSTRACT

In order to remove ammonia from water vapor-containing gases, in particular offgases, the gases are brought into intimate contact with warmed polyphosphoric acid, the polyphosphoric acid advantageously having a $P_2O_5$ content of from 70 to 84% by weight and a temperature of from 120° to 170° C.

6 Claims, 1 Drawing Sheet

PROCESS FOR THE REMOVAL OF AMMONIA FROM GASES

The present invention relates to a process for the removal of ammonia from water vapor-containing gases, in particular offgases.

In the preparation of ammonium polyphosphate by reacting phosphorus pentoxide and diammonium phosphate with ammonia gas, for example by the process of U.S. Pat. No. 3,978,195, it is necessary to maintain the ammonia atmosphere not only in the reaction phase, but also during the conditioning phase in the reactor, since otherwise thermal decomposition of the ammonium polyphosphate sets in. During the conditioning phase, continuing condensation of the phosphate groups liberates water vapor in the reactor, which must be removed in order to produce an ammonium polyphosphate of high quality. It is therefore important to pass a relatively large amount of ammonia through the reactor even during the conditioning phase, although the ammonia consumption in this phase is lower than in the reaction phase. Hitherto, the moisture-and ammonia-charged gases emerging from the reactor during the conditioning phase were absorbed in countercurrent scrubbers, and the ammonia-containing liquid was passed to a biological treatment plant.

It is disadvantageous here that the operation of a biological treatment plant is adversely affected by relatively large amounts of ammonia.

It is therefore an object of the present invention to indicate a process for the removal of ammonia from water vapor-containing gases, in which the ammonia is produced in reusable form. This is achieved according to the invention by bringing the gases into intimate contact with warmed polyphosphoric acid.

The process according to the invention may furthermore optionally have the following features:
a) a concentrated polyphosphoric acid is used;
b) the polyphosphoric acid has a $P_2O_5$ content of from 70 to 88% by weight, preferably from 76 to 84% by weight;
c) the polyphosphoric acid has a temperature of from 120° to 170° C.;
d) the ammonia- and water vapor-containing gases are introduced into a reaction zone which is partially filled with polyphosphoric acid, polyphosphoric acid is withdrawn continuously from the lower part of the reaction zone, and the polyphosphoric acid withdrawn is transferred to a column whose lower end is connected flow-wise to the reaction zone;
e) the ammonia- and water vapor-containing gases are introduced at a rate of from 50 to 200 l, preferably from 100 to 150 l, per hour and per l of polyphosphoric acid;
f) the ammonia- and water vapor-containing gases are allowed to bubble into the polyphosphoric acid which is located in a stirred reaction zone;
g) the ammonia- and water vapor-containing gases are allowed to bubble in at a rate of from 20 to 80 l, preferably from 40 to 60 l, per hour and per l of polyphosphoric acid.

In the process of the invention, the polyphosphoric acid completely absorbs both the ammonia and the water vapor.

The polyphosphoric acid used in the process according to the invention has a density of from 1.83 to 2.06 g/cm$^3$.

The ammonia-saturated polyphosphoric acid produced in the process according to the invention can be used as a component for the preparation of ammonium polyphosphate.

Figure 1:
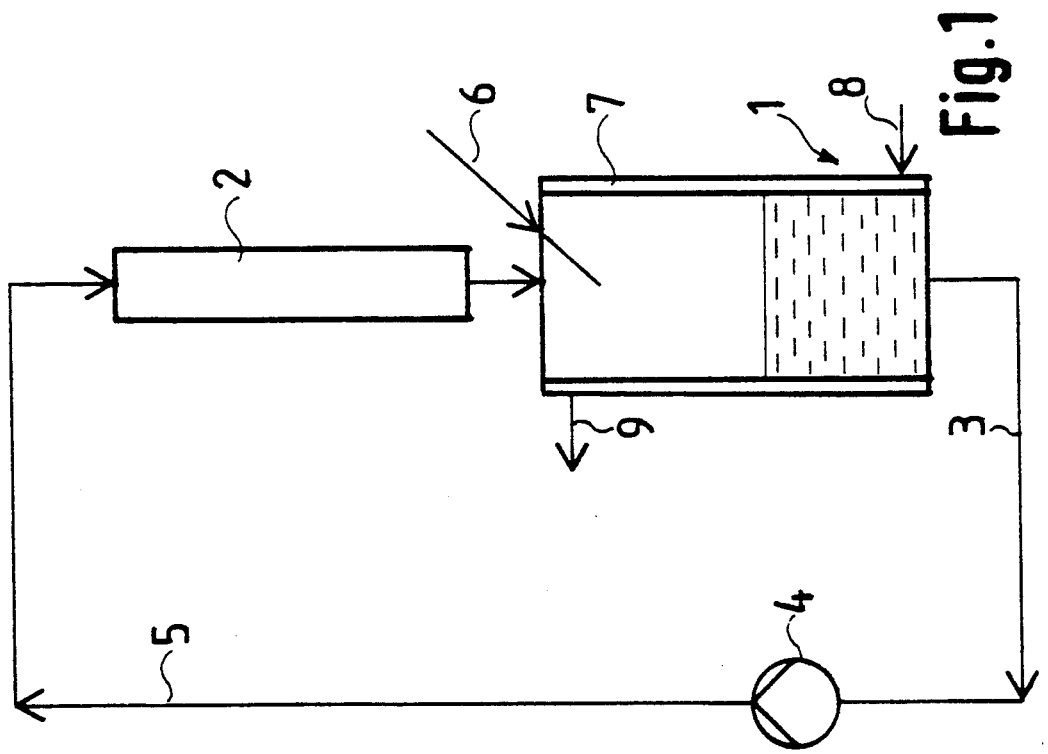

The attached drawing shows diagrammatic and sectional views of plants for carrying out the process according to the invention, in which FIG. 1 shows an absorption apparatus with circulation pump device and FIG. 2 shows an absorption apparatus with stirring device.

In FIG. 1, a twin-walled absorption vessel 1 is provided above which a column 2 is arranged which is connected flow-wise to the absorption vessel 1. A first line 3 leads from the base of the absorption vessel 1 to a pump 4. The pump 4 is itself connected flow-wise via a second line 5 to the upper part of the column 2.

A gas-inlet tube 6 enters the absorption vessel 1, while the annular space 7 formed between the twin walls of the absorption vessel 1 can be charged with a heat medium via a supply line 8 and an outlet line 9.

In FIG. 2, a round-bottom flask 11 with a stirrer 13 which passes through its central neck 12 is provided. A gas-inlet tube 14 projects into the round-bottom flask 11. A gas-outlet tube 15 leaves the round-bottom flask 11 and is connected flow-wise to a wash bottle 16.

The process according to the invention is illustrated by the examples below.

EXAMPLE 1

2.3 kg of polyphosphoric acid (84% by weight of $P_2O_5$) were introduced into the absorption vessel 1 (cf. FIG. 1). The column 2 used was a Vigreux column. The pump 4 used was a piston pump (piston diameter: 16 mm; stroke: 10 mm) operated at 153 strokes/min. Silicone oil at 160° C. was passed through the annular space 7 by a thermostat. The maximum temperature of the circulated polyphosphoric acid at an inlet rate for the ammonia- and water vapor-containing gas of 250 l/h was 195° C. After 200 l of offgas had been passed in, the viscosity of the polyphosphoric acid increased considerably, thus reducing its pumpability. It was thus no longer possible to absorb further amounts of ammonia and water vapor in the polyphosphoric acid.

EXAMPLE 2

Example 1 was repeated with the modifications that 2.25 kg of polyphosphoric acid were introduced into the absorption vessel 1 and the stroke of the piston pump was only 5 mm. The maximum temperature of the circulated polyphosphoric acid at an inlet rate for the ammonia- and water vapor-containing gas of 200 l/h was 208° C. The pumpability of the polyphosphoric acid was again reduced after 200 l of offgas had been passed in.

EXAMPLE 3

2 kg of polyphosphoric acid (84% by weight of $P_2O_5$) were introduced into the absorption vessel 11 (cf. FIG. 2) which was located in a thermostat filled with silicone oil and kept at 160° C. The speed of the stirrer 13 was set at 430 rpm. At an inlet rate for the ammonia- and water vapor-containing gas of 100 l/h, the maximum temperature of the polyphosphoric acid was determined at 208° C. After 200 l of gas had been passed in, the absorption capacity of the polyphosphoric acid was exhausted.

We claim:

1. A process for the removal of ammonia from water vapor-containing gases, which comprises introducing into a reaction zone being partially filled with warmed polyphosphoric acid having a $P_2O_5$ content of from 70 to 88% by weight and a temperature of from 120° to 170° C. the ammonia- and water vapor-containing gases at a rate of from 50 to 200 l per hour and per l of polyphosphoric acid, withdrawing continuously polyphosphoric acid from the lower part of the reaction zone, and transferring the polyphosphoric acid withdrawn to a column the lower end of which being flow-connected to the reaction zone with the resultant formation of a gas being freed from ammonia and water vapor and an ammonia-saturated polyphosphoric acid.

2. The process as claimed in claim 1, wherein the ammonia- and water vapor-containing gases are introduced into the reaction zone at a rate of from 100 to 150 l per hour and per l of polyphosphoric acid.

3. The process as claimed in claim 1, wherein the polyphosphoric acid has a $P_2O_5$ content of from 76 to 84% by weight.

4. A process for the removal of ammonia from water vapor-containing gases, which comprises allowing the ammonia- and water vapor-containing gases to bubble into warmed polyphosphoric acid having a $P_2O_5$ content of from 70 to 88% by weight and a temperature of from 120° to 170° C. at a rate of from 20 to 80 l per hour and per l of polyphosphoric acid, said polyphosphoric acid being located in a stirred reaction zone with the resultant formation of a gas being freed from ammonia and water vapor and an ammonia-saturated polyphosphoric acid.

5. The process as claimed in claim 4, wherein the ammonia- and water vapor-containing gases are allowed to bubble into the polyphosphoric acid at a rate of from 40 to 60 l.

6. The process as claimed in claim 4, wherein the polyphosphoric acid has a $P_2O_5$ content of from 76 to 84% by weight.

* * * * *